Dec. 19, 1961  G. W. ASHLOCK, JR  3,013,596
PITTED DATE SLICER

Original Filed March 18, 1954  5 Sheets—Sheet 1

INVENTOR.
GEORGE W. ASHLOCK, JR., Deceased
by ALMA E. ASHLOCK, Legal Representative
BY Naylor & Neal
ATTORNEYS

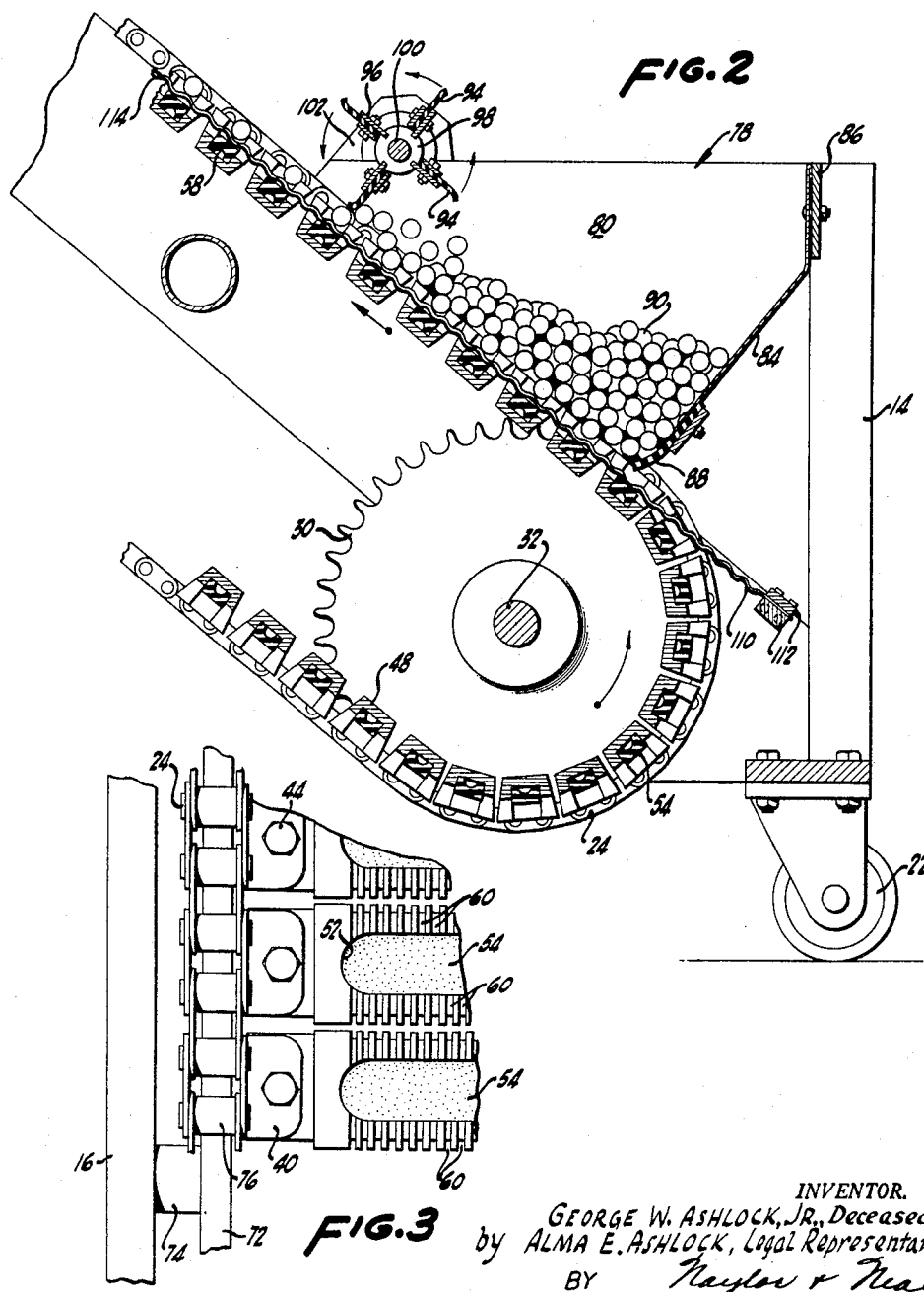

Dec. 19, 1961   G. W. ASHLOCK, JR   3,013,596
PITTED DATE SLICER
Original Filed March 18, 1954   5 Sheets-Sheet 3

INVENTOR.
GEORGE W. ASHLOCK, JR., Deceased
by ALMA E. ASHLOCK, Legal Representative
BY Naylor + Neal
ATTORNEYS Dec. 19, 1961 G. W. ASHLOCK, JR 3,013,596
PITTED DATE SLICER
Original Filed March 18, 1954 5 Sheets-Sheet 4
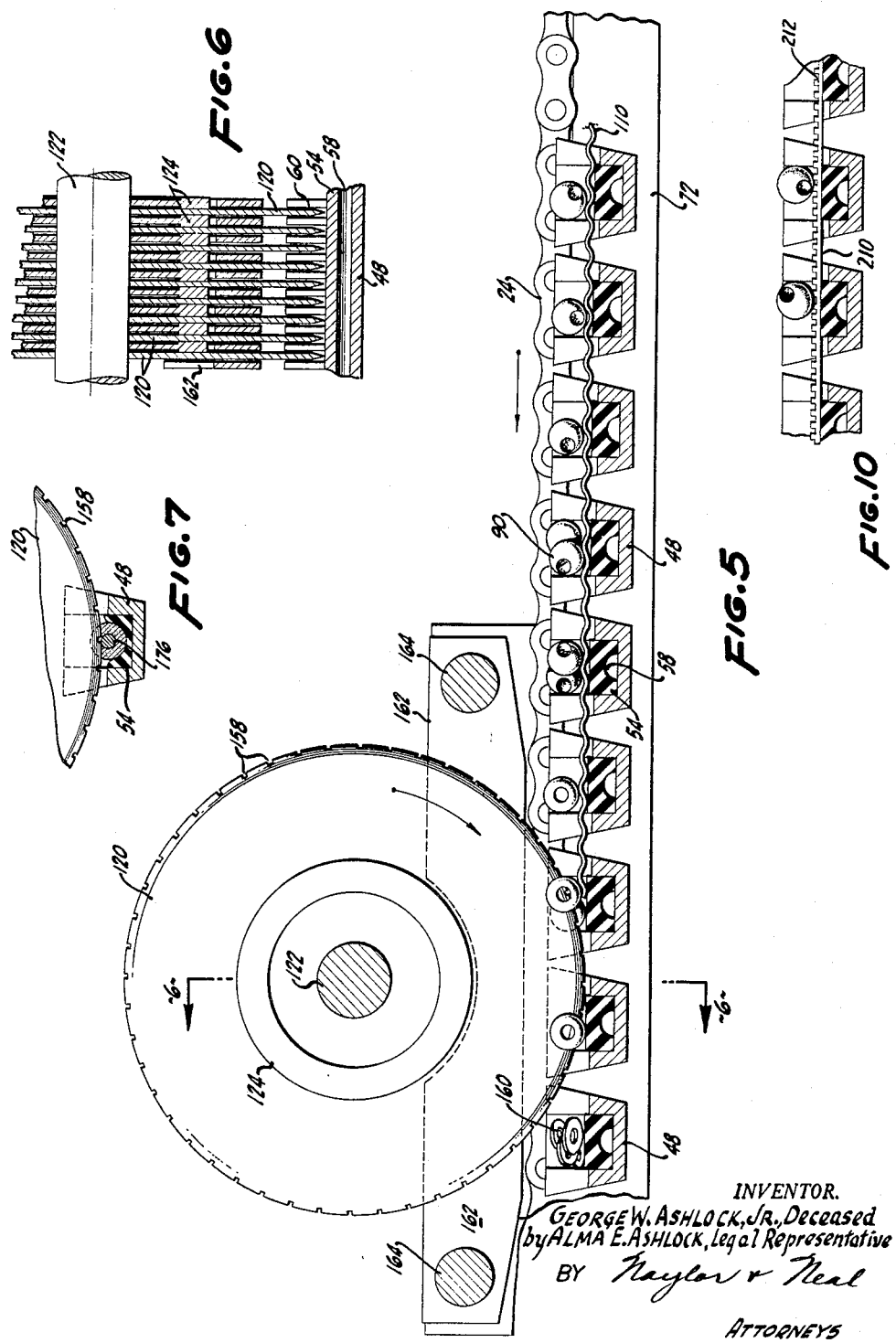
INVENTOR.
GEORGE W. ASHLOCK, JR., Deceased
by ALMA E. ASHLOCK, Legal Representative
BY Naylor & Neal
ATTORNEYS INVENTOR.
GEORGE W. ASHLOCK, JR., Deceased
by ALMA E. ASHLOCK, Legal Representative

ATTORNEYS

United States Patent Office 3,013,596
Patented Dec. 19, 1961

3,013,596
PITTED DATE SLICER
George W. Ashlock, Jr., deceased, late of Oakland, Calif., by Alma E. Ashlock, legal representative, Oakland, Calif., assignor, by mesne assignments, to George W. Ashlock Co., Oakland, Calif., a corporation of California
Original application Mar. 18, 1954, Ser. No. 417,047, now Patent No. 2,828,788, dated Apr. 1, 1958. Divided and this application Jan. 31, 1958, Ser. No. 712,557
2 Claims. (Cl. 146—98)

This invention relates to fruit handling machinery, and more particularly to a machine specifically adapted to slice olives and dates transversely of their longitudinal axes to thereby divide each olive or date into a plurality of thin slices.

This application is a division of co-pending application, Serial Number 417,047, filed March 18, 1954, now Patent No. 2,828,788, issued April 1, 1958.

An object of the invention is to provide an automatic machine which, by way of relatively minor modification, can be readily converted from an olive slicing machine to a date slicing machine and vice versa.

A further object of the invention is to provide in combination with feed means and conveyor means novel orienting means adapted to quickly end efficiently positionally adjust olives in the conveyor means from a haphazard positioning therein to a position in which their longitudinal axes are disposed transversely with respect to slicing knife elements.

Still a further object of the invention is to provide in connection with pocket type conveyor means means to insure that accidentally unpitted olives or dates which enter the conveyor pockets will not, by virtue of the pits damage the slicing knife elements.

And yet a further object of the invention is to provide in association with the slicing knife elements of an olive or date slicing machine a novel arrangement of knife elements stripper means adapted to scavenge the slices of olive or date meat from between the knife elements after the slicing operation.

Other objects and advantages of the invention will be apparent from the following description taken in conjunction with the drawings forming part of this specification, and in which:

FIGURE 2 is an enlarged detail view in vertical section of the feed end of the machine;

FIGURE 3 is an enlarged detail view in elevation of a portion of the conveyor and conveyor pocket arrangement of the machine;

FIGURE 5 is a view in section taken along lines 5—5 of FIGURE 4;

FIGURE 6 is a partial view in section taken along lines 6—6 of FIGURE 5;

FIGURE 7 is a detail view in section through a conveyor pocket illustrating the manner in which accidentally unpitted olives are prevented from imparting damage to the slicing knife elements;

FIGURE 10 is a detail view in section showing another form of orienting means for use with olives.

Figure 1:
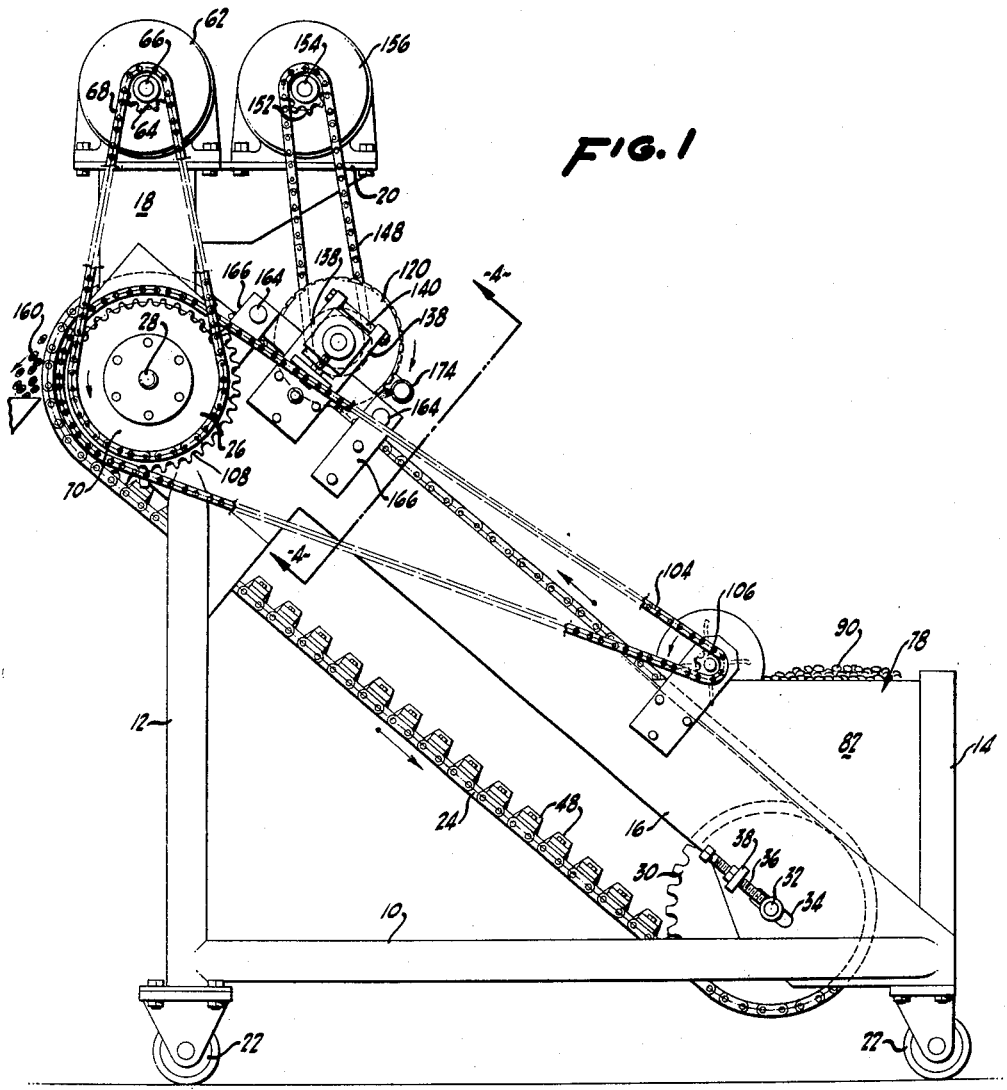
FIGURE 1 is a view in side elevation of the slicing machine of the invention, showing the same as being specifically adapted for the slicing of olives.

With reference to FIGURE 1, the support means for the operating elements of the machine comprise horizontal frame members 10, pairs of upright frame members 12 and 14, a pair of spaced parallel elongated plate members 16 interconnecting frame member 10, 12 and 14 and mutually secured thereto, as by welding, support framework 18 carried at the upper ends of members 16 and disposed in supporting relation with motor support platform 20, and wheel means 22 disposed in supporting relation with said framework.

The fruit conveyor portion of the machine comprises a pair of parallel endless chain drives, a pair of driver sprockets 26 mounted on shaft 28 journalled for rotation in the upper ends of frame members 16, a pair of idler sprockets 30 rotatably disposed on shaft 32 which is slidably disposed within slots 34 in frame members 16 and adjustable to control the tension of chain drives 24 by means of set screws 36 threadably engaged with ears 38 carried by frame members 16. Carried by the chains 24 at closely and equi-spaced intervals are pairs of oppositely disposed L-shaped brackets 40, the horizontally disposed arms of which are connected, as by bolts 42 and 44, to ears 46 forming a part of conveyor pocket members 48. Conveyor members 48 have formed therein elongated uninterrupted chambers 50 which, except for rounded end portions 52, are rectangular in cross section. Elongated and relatively thick rubber pads 54 are disposed within the chambers 50 to define thereabove the fruit carrying pocket portions 56 of said chambers 50. The rubber pads 54 are provided at their underside with full length grooves 58 which are preferably semi-cylindrical in form, said grooves being provided for a purpose hereinafter described. The forward and rearward pocket-defining portions of conveyor members 48 are provided with a plurality of equi-spaced pairs of oppositely disposed milled knife clearance slots 60.

Motor 62 mounted on platform 20 serves to drive chain drive sprockets 26 through sprocket 64 mounted on the output shaft 66 of the motor, chain drive 68, and sprocket 70 which is in mesh with chain 68 and fixedly carried by shaft 28. In order to insure that there will be no sag or misalignment of the upper run of the conveyor, guide rails 72 connected by studs 74 to frame members 16 are disposed in supporting relation with the chain bushings 76.

Means for feeding olives, and the like, to the conveyor comprise a hopper indicated generally at 78 and comprising spaced parallel side wall members 80 and 82 and end wall member 84 mounted on cross members 86 interconnecting upright frame members 14. The lower end of wall 84, which terminates short of the upper run of the conveyor, has secured thereto a resilient baffle member 88 which is disposed in brushing relation with said conveyor to prevent the olives 90 from falling off of the conveyor. The upper run of the conveyor, of course, forms, in effect, a moving lower wall for the hopper 78, the conveyor members 48 being disposed sufficiently close together to prevent the passage therebetween of said olives.

Means are provided in association with the hopper and conveyor to prevent olives in excess of one row in depth from being fed into the conveyor pockets 56, said means comprising resilient paddle-type brush elements 94 clamped to rib members 96 carried between hub members 98 secured to shaft 100, which shaft is journalled in brackets 102 fixedly secured to frame members 16. Shaft 100 is driven by chain 104 which passes over sprocket 106 mounted on shaft 100 and over sprocket 108 mounted on shaft 28.

Figure 4:
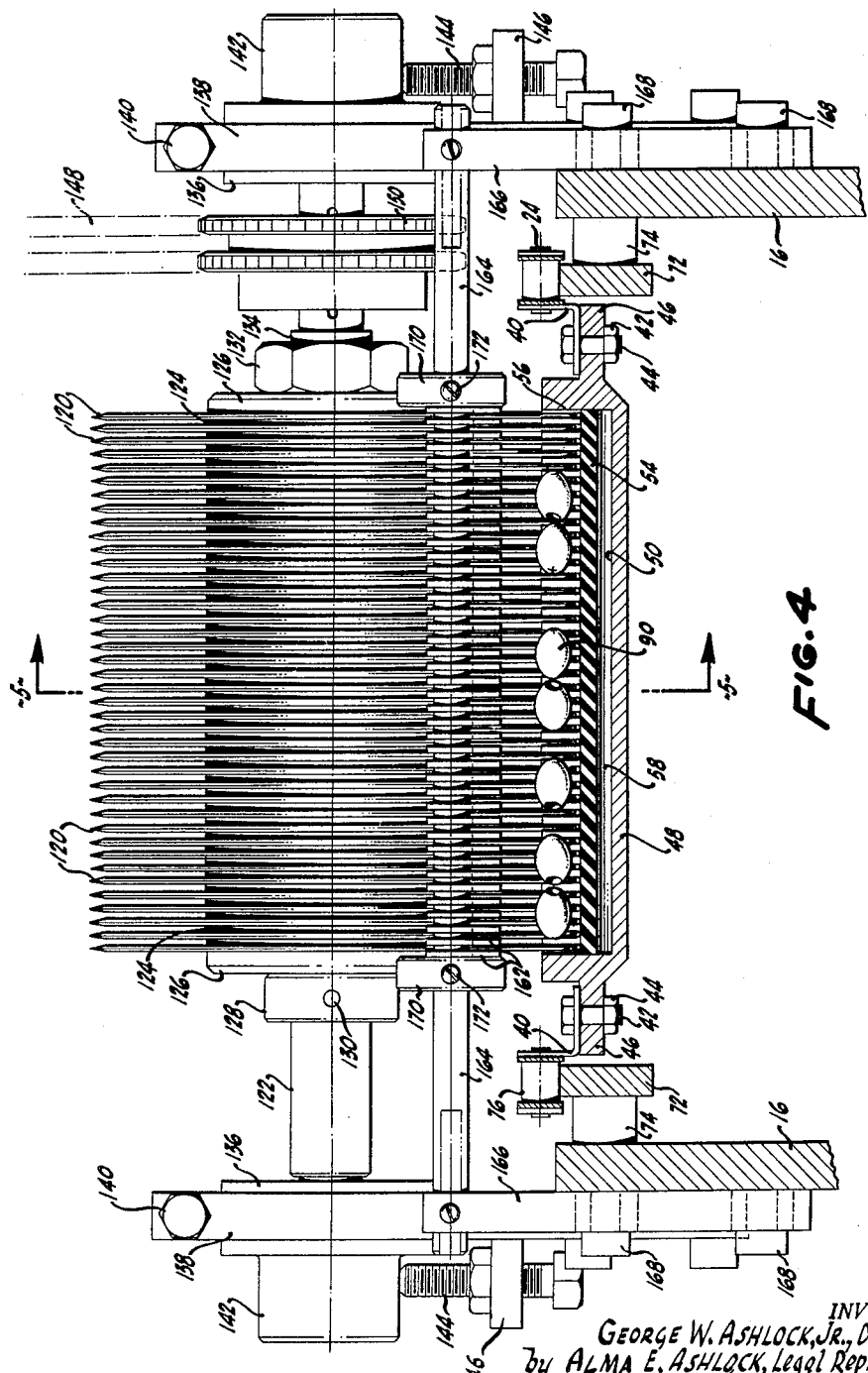
FIGURE 4 is an enlarged detail view taken along lines 4—4 of FIGURE 1.

The machine embodies orientation means adapted to cause the olives, which are initially positioned at random within the conveyor pockets 56, to become positioned with their longitudinal axes disposed transversely to the direction of travel of the conveyor, as illustrated in FIGURE 4, said means comprising a plurality of stationary corrugated wires 110 having their lower ends commonly disposed between clamping members 112 positioned between the lower ends of frame members 16. The wires 110, which are unsupported at their upper ends 114, extend through each of the rows of aligned slots 60 in the conveyor members 48 in engagement with the rubber pads 54. Relative movement between the olives in the pockets and the wires 110, which preferably have horizontal components of bend as well as vertical components, causes orientation of the olives in the manner described.

Slicing means for the olives comprise a plurality of thin annular knife blades 120 mounted on shaft 122, said blades being maintained in spaced relation by spacer rings 124. The blades 120 and rings 124 are clamped together and fixedly positioned on shaft 122 by end rings 126, collar 128 secured to shaft 122, as by pin 130, and nut 132 disposed on threaded portion 134 of the shaft in pressing relation with its associated end plate 126. The ends of shaft 122 are journalled for rotation in journal blocks 136, said blocks being rectangular in form and being mounted for adjustable sliding movement in a direction normal to the direction of run of the conveyor between pairs of spaced parallel clamping arms 138 interconnected at their upper ends by tie bolts 140. The journal boxes 136 are provided with outwardly extending hubs 142 having associated therewith vertically extending set screws 144 threadably engaged with ears 146 carried by frame member 16. With the arrangement described, it will be clear that shaft 122 may be adjusted toward or away from the conveyor so that the cutting edges of the blades 120 slice through the fruit without materially disturbing the surface of the rubber pads 54 which support the fruit within the conveyor pockets 56.

The slicing assembly for the olives is driven through chain drive 148 which passes over sprocket 150 keyed to shaft 122 and over sprocket 152 secured to output shaft 154 of motor 156, the latter being mounted on platform 20.

The knife blades 120 are rotated in a clockwise direction, with reference to FIGURES 1 and 5, and thus the knife blades at their points of slicing contact with the olives are moving in the same direction as the olives. The blades urge the olives against the forward walls of pockets 56, and thus, in effect, the olives are fixedly positioned for the slicing operation. In order to facilitate the slicing of the olives, the blades are provided with a plurality of equi-spaced notches 158 in their cutting edges, said notches being, preferably, rectangular in form and being, for example, forty in number, i.e. spaced nine degrees apart.

As the thin olive slices 160 are produced by the knife blades, they tend to become wedged therebetween and to be rotated therewith. The engagement between the olives and the forward walls of pockets 56 prevents such action for the most part. However, in order to insure that no random olive slices will be rotated in company with the knife blades, scavenging means in the form of thin flat stripper bars 162 are disposed between each pair of adjacent knife blades. The ends of stripper bars 162 are sleeved on shafts 164 carried by brackets 166 secured, as by bolts 168, to frame members 16. Collars 170 secured to shafts 164 by set screws 172 serve to adjustably maintain the stripper bars in scavenging relation to blades 120. The bars 162 also serve to strip olive shreds, and the like, from the knife blades so that the slicing surfaces of the blades presented to the olives are substantially clean at all times. A water spray line 174 (FIGURE 1) is disposed adjacently to the leading edges of the knife blades. The water spray is effective to lubricate both the blades and the olives for the slicing operation.

In the event that an unpitted olive, such as that indicated at 176 in FIGURE 7, engages the knife blades, the semicylindrical groove 58 at the underside of the rubber pad 54 supporting such olives enables the unpitted olive to be pressed downwardly by the knife blade so that the blade can clear the pit without damage to the cutting edges.

In FIGURE 10, there is shown another form of orienting means for the olives, said means comprising thin flat strips 210 of metal, or other desired solid material, which, similar to the corrugated wires 110, are anchored at one end and free at the other and extend through each of the rows of aligned slots 60 in the conveyor members 48. Strips 210 are provided with a plurality of preferably equispaced and rectangular notches 212 which are substantially similar to the notches 158 formed in knife blades 120.

Figure 8:
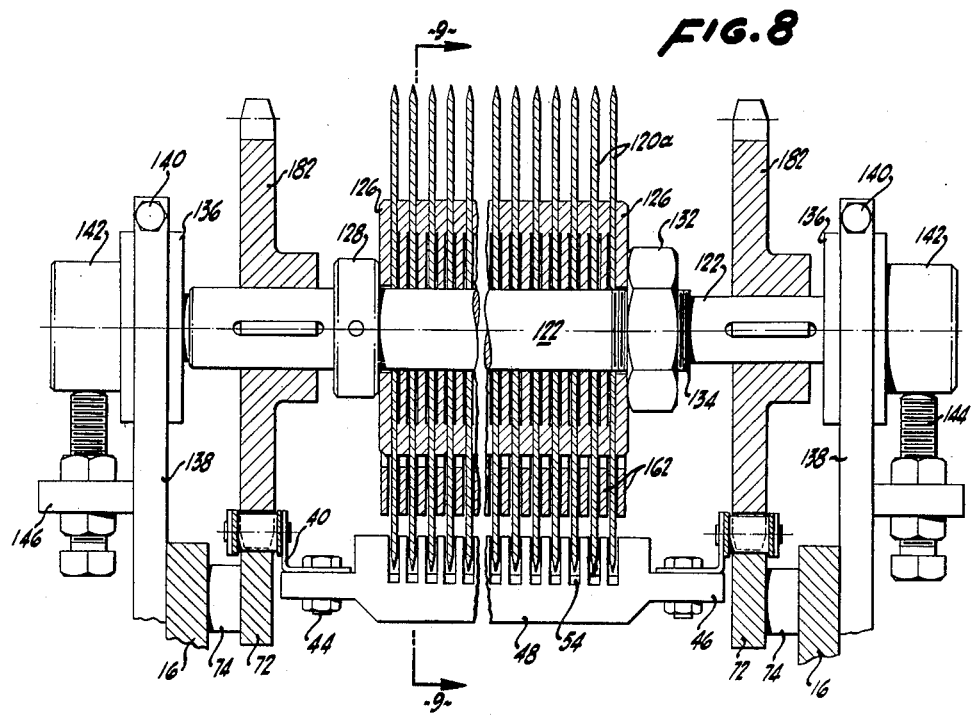
FIGURE 8 is a view generally similar to that of FIGURE 4, but showing the machine as having been modified for use in the slicing of dates.
Figure 9:
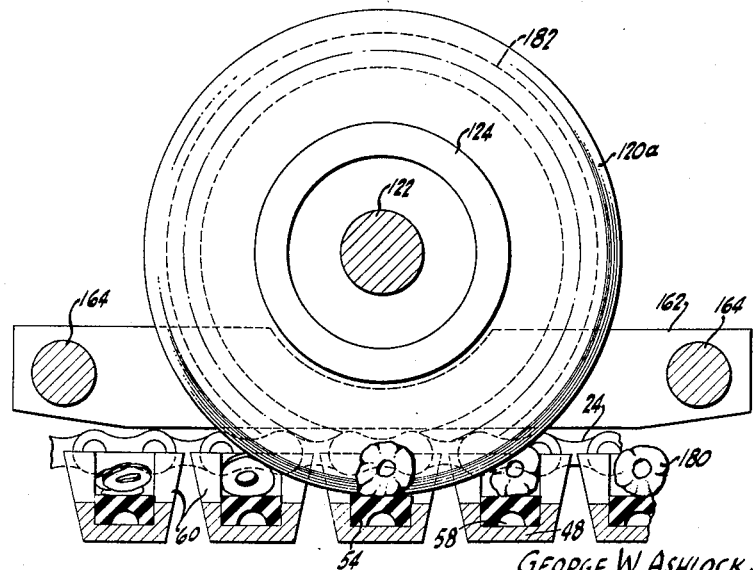
FIGURE 9 is a view taken along lines 9—9 of FIGURE 8.

The machine thus described may be readily and simply adapted for the slicing of dates, as illustrated in FIGURES 8 and 9. Except for the following particulars, the machine remains the same as that hitherto described. The dates 180, being relatively elongated in form, can only be deposited within the conveyor pockets 56 in a position in which they are disposed transversely to the cutting blades 120a, and thus the orientation wires 110 are not employed. Secondly, the sticky and relatively heavy-body qualities of dates call for a slower, or pressure type, cutting action, rather than the high speed saw-type cutting action described above in connection with the handling of the olives, and hence the notches 158 are embodied in knife blades 120a, and instead of employing a separate drive for the knives, the blades 120a are driven at the same rate of travel as that of the conveyor, the drive connection for knife blade shaft 122 being effected by sprockets 182 mounted on said shaft and disposed in mesh with conveyor chains 24.

While a detailed embodiment of the machine of the invention and a modification of said embodiment have been shown and described, it is to be understood that all structural arrangements equivalent thereto are deemed to be within the spirit and scope of the invention.

What is claimed is:

1. Apparatus adapted for the slicing of pitted fruit comprising conveyor-borne receptacle members having fruit carrying pockets defined therein, at least one annular knife blade disposed normal to the path of movement of said members, kerfs formed in said receptacle members enabling said blade to slicingly engage fruit within said pockets, said pockets having resilient but firm bottom walls adapted to firmly support pitted fruit in engagement with said blade, said walls having recesses formed in the undersides thereof enabling said walls to yieldably support unpitted fruit under the action of engagement between said unpitted fruit and said blade, whereby said blade is enabled to clear the pit portions of said fruit.

2. Apparatus adapted for the slicing of pitted dates comprising conveyor-borne receptacle members having fruit carrying pockets defined therein, at least one annular knife blade disposed normal ot the path of movement of said members, kerfs formed in said receptacle members enabling said blade to slicingly engage dates within said pockets, said pockets having resilient but firm bottom walls adapted to firmly support pitted dates in engagement with said blade, said walls having recesses formed in the undersides thereof enabling said walls to yieldably support unpitted dates under the action of engagement between said unpitted dates and said blade, whereby said blade is enabled to clear the pit portions of said dates, means operatively connected to said receptacle members to move said receptacle members at a predetermined rate past said knife blade, and means operatively connected to said knife blade to rotatably drive said knife blade at a rate such that there is substantially no relative movement between a given receptacle member and the peripheral portion of said blade passing through the kerfs thereof, whereby a date disposed within said member will be subdivided by pressure-type shearing action of said blade.

References Cited in the file of this patent

UNITED STATES PATENTS

| | | |
|---|---|---|
| 2,092,103 | Blakney et al. | Sept. 7, 1937 |
| 2,333,576 | Kerr | Nov. 2, 1943 |